United States Patent
Yang et al.

(10) Patent No.: US 12,189,079 B2
(45) Date of Patent: Jan. 7, 2025

(54) TIME DOMAIN ELECTROMAGNETIC TENSOR BASED LOGGING METHOD

(71) Applicant: China University of Mining and Technology, Jiangsu (CN)

(72) Inventors: Haiyan Yang, Jiangsu (CN); Jianhua Yue, Jiangsu (CN); Zhixin Liu, Jiangsu (CN); Shuanggui Hu, Jiangsu (CN); Yunlei Xu, Jiangsu (CN); Wenyu Li, Jiangsu (CN); Huageng Ran, Jiangsu (CN); Rongqi Che, Jiangsu (CN); Menglang Sun, Jiangsu (CN); Zhenyang Li, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/569,602
(22) PCT Filed: Oct. 28, 2022
(86) PCT No.: PCT/CN2022/128195
§ 371 (c)(1),
(2) Date: Dec. 13, 2023
(87) PCT Pub. No.: WO2023/072235
PCT Pub. Date: May 4, 2023

(65) Prior Publication Data
US 2024/0302561 A1 Sep. 12, 2024

(30) Foreign Application Priority Data
Oct. 29, 2021 (CN) .......................... 202111269912.5

(51) Int. Cl.
*G01V 3/28* (2006.01)
*G01V 3/38* (2006.01)

(52) U.S. Cl.
CPC . *G01V 3/28* (2013.01); *G01V 3/38* (2013.01)

(58) Field of Classification Search
None
See application file for complete search history.

(56) References Cited

U.S. PATENT DOCUMENTS

| | | | |
|---|---|---|---|
| 2007/0108981 A1* | 5/2007 | Banning-Geertsma | G01V 3/28 324/338 |
| 2009/0248308 A1* | 10/2009 | Luling | G01V 3/28 702/7 |

(Continued)

FOREIGN PATENT DOCUMENTS

| | | |
|---|---|---|
| CN | 106772644 | 5/2017 |
| CN | 109209354 | 1/2019 |

(Continued)

OTHER PUBLICATIONS

CN111058834A, IDS reference, translation (Year: 2020).*

(Continued)

*Primary Examiner* — Lina Cordero
(74) *Attorney, Agent, or Firm* — JCIPRNET

(57) ABSTRACT

A time domain electromagnetic tensor based logging method, relating to the field of induction logging. A transmitting coil system Tx and a receiving coil system Rx are each composed of three orthogonal direction coils, and the transmitting coil system and the receiving coil system form a borehole probe; a time domain electromagnetic field is excited by means of two orthogonal transmitting coil systems Tx, and a secondary field signal is received by two orthogonal receiving coil systems Rx located above transmitting coils and having a distance D; during each measurement, three directions are used for transmitting, nine component data is received at the same time, and each component is a series of induction potentials in one-to-one correspondence with measurement time sequences, and a potential or resistance change, from near to far, of the rock stratum where a measurement point is located is obtained after time-depth conversion.

5 Claims, 13 Drawing Sheets

(56) References Cited

U.S. PATENT DOCUMENTS

2012/0143509 A1* 6/2012 G. ........................... G01V 3/28
702/7
2019/0129056 A1* 5/2019 Rasmus ................. G01V 3/30

FOREIGN PATENT DOCUMENTS

| CN | 111058834 | 4/2020 |
| CN | 112814668 | 5/2021 |
| CN | 114089428 | 2/2022 |
| EP | 0084001 | 7/1983 |

OTHER PUBLICATIONS

Minjie Yan et al., "Theoretical Researches On Three Component Induction Logging System", Petroleum Instruments, Feb. 15, 2009, with English abstract, pp. 9-12, vol. 23, No. 1.
"International Search Report (Form PCT/ISA/210) of PCT/CN2022/128195", mailed on Dec. 20, 2022, with English translation thereof, pp. 1-5.
"Written Opinion of the International Searching Authority (Form PCT/ISA/237) of PCT/CN2022/128195", mailed on Dec. 20, 2022, pp. 1-4.

* cited by examiner

TIME DOMAIN ELECTROMAGNETIC TENSOR BASED LOGGING METHOD

CROSS-REFERENCE TO RELATED APPLICATION

This application is a 371 of international application of PCT application serial no. PCT/CN2022/128195, filed on Oct. 28, 2022, which claims the priority benefit of China application no. 202111269912.5, filed on Oct. 29, 2021. The entirety of each of the above mentioned patent applications is hereby incorporated by reference herein and made a part of this specification.

TECHNICAL FIELD

The present disclosure belongs to the technical field of the induction logging, and specifically relates to a logging method based on a time-domain electromagnetic tensor.

BACKGROUND

The induction logging method developed on the basis of the ground drilling has been widely used in the field of the oil and the gas exploration, and has played an important role in stratum correlation, calculation of stratum water saturation, and identification of oil, gas, and water layers. The dynamic range of the resistivity measured by the traditional induction logging is low due to the limitation by the levels of instruments and method, which causes that the vertical resolution is not high, and the identification for the thin interbedding of the sand-shale is not high, especially. This induction logging method is implemented in the frequency domain, after the operation frequency is selected, only the potential or the resistivity value for the layer where the corresponding measurement point is located can be obtained for each measurement.

In the field of the water prevention and control in coal mines, the hole-tunnel transient electromagnetic measurement method is developed with reference to the idea of ground-well transient electromagnetic method. In this method, the transmitting coil is arranged at the head of the tunnel, and a three-component probe is adopted in the horizontal borehole of the heading head to measure, and the detection area is divided into four quadrants based on the coil azimuth and the normal direction of the horizontal borehole, and the quadrant where the abnormal body is located is determined according to the measured result for the three-component magnetic field, so as to achieve the purpose of advanced detection.

The existing induction logging method is measured by the scalar, and only the single-component transmitting coil and receiving coil are existed. The transmitting coil transmits the primary field to the interior of the stratum, after the primary field is powered off, the induced secondary field generated by the underground medium is measured. This method can only obtain the component of one direction of the geological body for each measurement, and this component only contains one potential datum, and the tensor conductivity of the geological body cannot be obtained.

SUMMARY OF INVENTION

Technical objectives are as follows. In view of the above problems, a logging method based on time-domain electromagnetic tensor is provided in the present disclosure, which simultaneously receives the secondary field information in three component directions through exciting by the transmitting coils in different directions, can receive the induced potential sequence around the well-wall decaying with time and reflects the stratum information from near to far, and effectively identifies the anisotropy characteristics of the geological body.

Technical solutions: in order to achieve the objectives of the present disclosure, the technical solutions adopted in the present disclosure are as follows. Provided is a logging method based on time-domain electromagnetic tensor, the method specifically comprises as follows.

A transmitting coil system Tx and a receiving coil system Rx are constructed, the transmitting coil system Tx and the receiving coil system Rx are respectively composed of three coils in different direction and orthogonal to each other, and a borehole probe is formed by the transmitting coil system Tx and the receiving coil system Rx.

A measurement point is set, a time-domain electromagnetic field is excited by the pairwise orthogonal transmitting coil system Tx, and secondary field signals are received by the pairwise orthogonal receiving coil system Rx located above the transmitting coil with a distance of D.

The secondary field signals in three component directions are received simultaneously to obtain nine component data, and each component is a series of induction potentials corresponding to measurement time series one by one.

A potential sequence or a resistivity value changing over time for a layer where a corresponding measurement point is located is obtained through each measurement, and a change on a potential or a resistivity of a layer where the measurement point is located from near to far is obtained after time-depth conversion.

Further, provided is a method for obtaining each component value and the induction potential, and the method is as follows.

A stratigraphic coordinate system (x,y,z) and an instrument coordinate system (x',y',z') are set, θ is set as an inclined azimuth angle of an instrument tilted, and β is set as a self-rotation angle of the instrument during a measuring process and a rotating angle of the instrument during a descending process, that is an azimuth angle of the instrument.

Equivalent magnetic moments in three directions of the transmitting coils in the probe are $M_{x'}$, $M_{y'}$, $M_{z'}$, and a relationship between magnetic field intensities $H_{x'}$, $H_{y'}$, $H_{z'}$ received by the receiving coils in three directions of the probe and the equivalent magnetic moments is:

$$\begin{pmatrix} H_{x'} \\ H_{y'} \\ H_{z'} \end{pmatrix} = \overline{R^T} \cdot \overline{G} \cdot \overline{R} \cdot \begin{pmatrix} M_{x'} \\ M_{y'} \\ M_{z'} \end{pmatrix}$$

where $\overline{G}$ denotes a Dyadic Green's function, $\overline{R}$ denotes a transformation matrix from the instrument coordinate system to the stratigraphic coordinate system, and $\overline{R^T}$ denotes a transpose matrix of $\overline{R}$, and a formula for calculating the Dyadic Green's function $\overline{G}$ by adopting a transmission line equivalent principle is as follows:

$$\overline{G_{HM}^{mu}} = \begin{bmatrix} G_{xx}^{HM} & G_{xy}^{HM} & G_{xz}^{HM} \\ G_{yx}^{HM} & G_{yy}^{HM} & G_{yz}^{HM} \\ G_{zx}^{HM} & G_{zy}^{HM} & G_{zz}^{HM} \end{bmatrix} =$$

-continued $$\begin{bmatrix} -\frac{k_x^2}{k_\rho^2} I_v^h - \frac{k_y^2}{k_\rho^2} I_v^e & \frac{k_x k_y}{k_\rho^2}(I_v^e - I_v^h) & \frac{k_x}{\omega\mu_n} I_i^h \\ \frac{k_x k_y}{k_\rho^2}(I_v^e - I_v^h) & -\frac{k_x^2}{k_\rho^2} I_v^e - \frac{k_y^2}{k_\rho^2} I_v^e & \frac{k_y}{\omega\mu_n} I_i^h \\ \frac{k_x}{\omega\mu_m} V_v^h & \frac{k_y}{\omega\mu_m} V_v^h & -\frac{1}{i\omega\mu_m}\left[\frac{k_\rho^2}{-i\omega\mu_m} V_i^h - \delta(z-z')\right] \end{bmatrix}$$

where $\overline{G}_{HM}^{mn}$ denotes a Green's function corresponding to a magnetic field generated by a magnetic current source in area n in area m, each element in the matrix denotes a component in different directions, $\tilde{G}_{xy}^{HM}$ denotes a component in xy directions, $k_x$, $k_y$ and $k_\rho$ respectively denote propagation coefficients of electromagnetic waves in three directions, i denotes an imaginary number, ω denotes an angular frequency, $\mu_n$ denotes a magnetic permeability in area n, Um denotes a magnetic permeability in area m, z'denotes a field source position, z denotes a field point position, $V_i^P$ denotes a voltage excited by a unit parallel current source, $I_i^P$ denotes a current excited by the unit parallel current source, $V_v^P$ denotes a voltage excited by a unit series voltage source and $I_v^P$ denotes a current excited by the unit series voltage source, and when P is e and h, denotes a transverse wave and a transverse magnetic wave respectively, and δ denotes a Dirac function.

The magnetic field intensities received by the receiving coils of the probe in a frequency domain are calculated, and a calculated frequency-domain magnetic field is converted into a time-domain magnetic field according to a conversion relationship between the time-domain magnetic field and the frequency-domain magnetic field, so as to obtain the induction potentials.

Further, when the transmitting coil system Tx and the receiving coil system Rx are in a same stratum, and m is equal to n, the electromagnetic field excited by the transmitting coil system at the position z is received by the receiving coil at the position z', obtained voltages and currents are respectively as follows:

$$V_i^P(n,z;n,z') = \frac{Z_n^P}{2}\left[e^{ik_{zn}^P|z-z'|} + \frac{1}{D_n^P}C_1 \cdot R^P\right]$$

$$V_v^P(n,z;n,z') = \frac{1}{2}\left[Sgn(z-z')e^{ik_{zn}^P|z-z'|} + \frac{1}{D_n^P}C_2 \cdot R^P\right]$$

$$I_i^P(n,z;n,z') = \frac{1}{2}\left[Sgn(z-z')e^{ik_{zn}^P|z-z'|} + \frac{1}{D_n^P}C_3 \cdot R^P\right]$$

$$I_v^P(n,z;n,z') = \frac{Y_n^P}{2}\left[e^{ik_{zn}^P|z-z'|} + \frac{1}{D_n^P}C_4 \cdot R^P\right]$$

where Sgn( ) denotes a sign function, $k_{zn}^P$ denotes a wave number of a n-th layer in direction z of the stratigraphic coordinate system, i denotes an imaginary number, $D_n^P$ denotes a correlation function between a thickness of the n-th layer of the stratum and a collective reflection coefficient, $Y_n^P$ denotes an admittance of the n-th layer of the stratum, $Z_n^P$ denotes an impedance of the n-th layer of the stratum, $C_1$, $C_2$, $C_3$ and $C_4$ respectively denote matrix coefficients, and $R^P$ denotes a reflection coefficient matrix;

$$Sgn(z) = \begin{cases} 1, z \geq 0 \\ -1, z < 0 \end{cases}, D_n^P = 1 - \overleftarrow{R}_n^P \overrightarrow{R}_n^P t_n, d_n = z_{n-1} - z_n, t_n = e^{i2k_{zn}^P d_n}$$

-continued $$\begin{bmatrix} C_1 \\ C_2 \\ C_3 \\ C_4 \end{bmatrix} = \begin{bmatrix} 1 & 1 & 1 & 1 \\ 1 & -1 & 1 & -1 \\ -1 & 1 & 1 & -1 \\ 1 & -1 & 1 & 1 \end{bmatrix}$$

$$R^P = \begin{bmatrix} \overrightarrow{R}_n^P e^{ik_{zn}^P[2z_{n-1}-(z+z')]} \\ \overleftarrow{R}_n^P e^{ik_{zn}^P[(z+z')-2z_n]} \\ \overleftarrow{R}_n^P \overrightarrow{R}_n^P e^{ik_{zn}^P[2d_n+(z-z')]} \\ \overleftarrow{R}_n^P \overrightarrow{R}_n^P e^{ik_{zn}^P[2d_n-(z-z')]} \end{bmatrix}$$

where $d_n$ denotes a thickness at the n-th layer in the stratum, $z_n$ denotes a depth of the n-th layer of the stratum, a subscript n denotes a layer number, a change of the subscript n denotes a change of the layer number, $t_n$ denotes a thickness factor of the n-th layer of the stratum, $\overleftarrow{R}_n^P$ denotes a collective reflection coefficient of the stratum below the n-th layer, and $\overrightarrow{R}_n^P$ denotes a collective reflection coefficient of the stratum above the n-th layer.

Further, when the transmitting coil system Tx and the receiving coil system Rx are not in a same stratum, the electromagnetic field excited by the transmitting coil system at position z is received by the receiving coil at the position z', and obtained voltages and currents are respectively as follows:

$$V_i^P(m,z;n,z') = V_v^P(m,z;n,z') =$$

$$V_{v,i}^P(m,z_{n-1};n,z')\left\{\prod_{j=m+1}^{n-1}\overleftarrow{T}_j^P\right\}\frac{\left[1+\overleftarrow{R}_m^P e^{i2k_{zm}^P(z_{m-1}-z)}\right]e^{ik_{zm}^P(z-z_m)}}{1+\overleftarrow{R}_m^P t_m}$$

$$I_i^P(m,z;n,z') = I_v^P(m,z;n,z') =$$

$$V_{v,i}^P(m,z_n;n,z')\left\{\prod_{j=m+1}^{n-1}\overleftarrow{T}_j^P\right\}\frac{Y_m^P\left[-1+\overleftarrow{R}_m^P e^{i2k_{zm}^P(z_{m-1}-z)}\right]e^{ik_{zm}^P(z-z_m)}}{1+\overleftarrow{R}_m^P t_m}$$

where $\overleftarrow{T}_j^P$ denotes a voltage transmission coefficient of the j-th layer, $z_n$ denotes a depth of the n-th layer of the stratum, a subscript n denotes a layer number, a change of the subscript n denotes a change of the layer number, $t_m$ denotes a thickness factor of an m-th layer of the stratum, and $\overleftarrow{R}_m^P$ denotes a collective reflection coefficient of the stratum below the m-th layer.

Further, formulas for calculating the collective reflection coefficients of the n-th layer downward and upward are as follows:

$$\overleftarrow{R}_n^P = \frac{R_{n+1,n}^P + \overleftarrow{R}_{n+1}^P t_{n+1}}{1 + R_{n+1,n}^P \overleftarrow{R}_{n+1}^P t_{n+1}}$$

$$\overrightarrow{R}_n^P = \frac{R_{n-1,n}^P + \overrightarrow{R}_{n-1}^P t_{n-1}}{1 + R_{n-1,n}^P \overrightarrow{R}_{n-1}^P t_{n-1}}$$

where $t_{n+1}$ denotes a thickness factor of a n+1-th layer of the stratum, $t_{n-1}$ denotes a thickness factor of a n−1-th layer of the stratum, $R_{n+1,n}^P$ denotes a reflection coefficient from the n+1-th layer to the n-th layer, $R_{m,n}^P$ denotes a reflection coefficient from the n-th layer to the m-th layer, and a formula for calculating the $R_{m,n}^P$ is as follows:

$$R_{m,n}^P = \frac{Z_m^P - Z_n^P}{Z_m^P + Z_n^P}$$

where $Z_m^P$ denotes an impedance of the m-th layer of the stratum, $Z_n^P$ denotes a impedance of the n-th layer of the stratum.

Beneficial effects: Compared with the prior art, the technical solutions of the present disclosure have the following beneficial technical effects.
  (1) The present disclosure can obtain nine components of the electrical conductivity of the underground geological body, while the prior art is a standard measurement, which can only obtain a single component of the geological body.
  (2) The present disclosure can obtain the induced potential sequence of each component decaying with time, corresponding to the distance from near to far, which can reflect the change of the stratum electrical properties around the borehole from near to far.
  (3) The present disclosure can obtain the horizontal and vertical electrical conductivities in all directions of the geological body around the well-wall in one measurement by full using of the drilling resources left over from the drilling, so as to effectively identify the anisotropic characteristics of the stratum. However, the prior art is insufficient to identify the anisotropic characteristics of the stratum.

Figure 6:
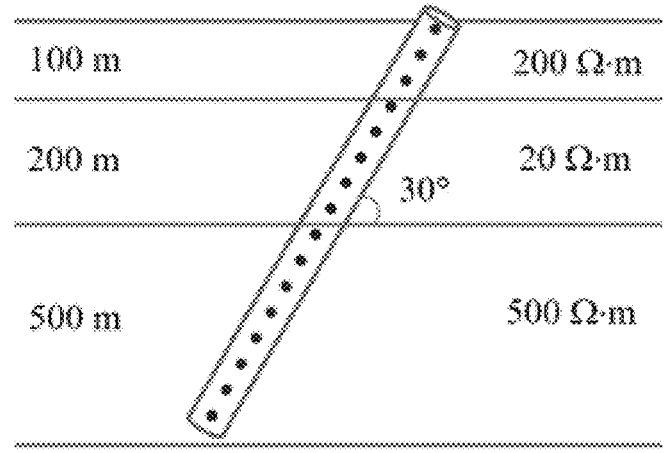

The (a) of FIG. 6 and the (b) of FIG. 6 respectively illustrate a three-layer H-type stratum model of a vertical shaft and a three-layer H-type stratum model of an inclined shaft.

Figure 1:
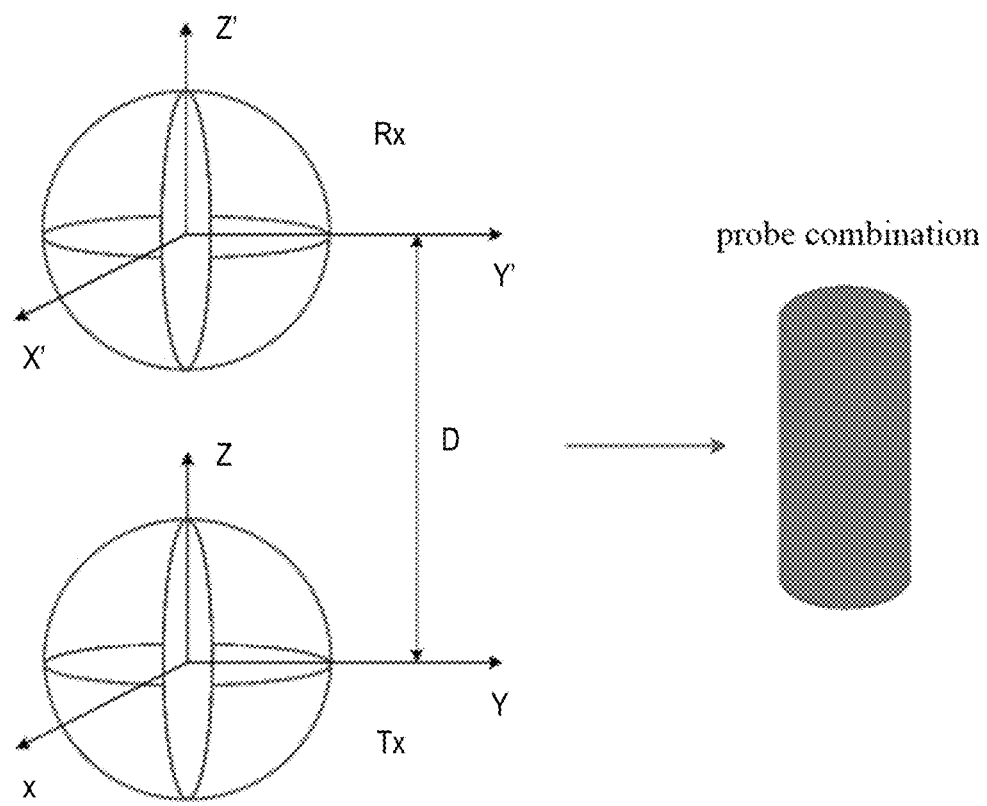
FIG. 1 illustrates a transmitting-receiving probe of a logging based on a time-domain electromagnetic tensor.
Figures 1, 7:
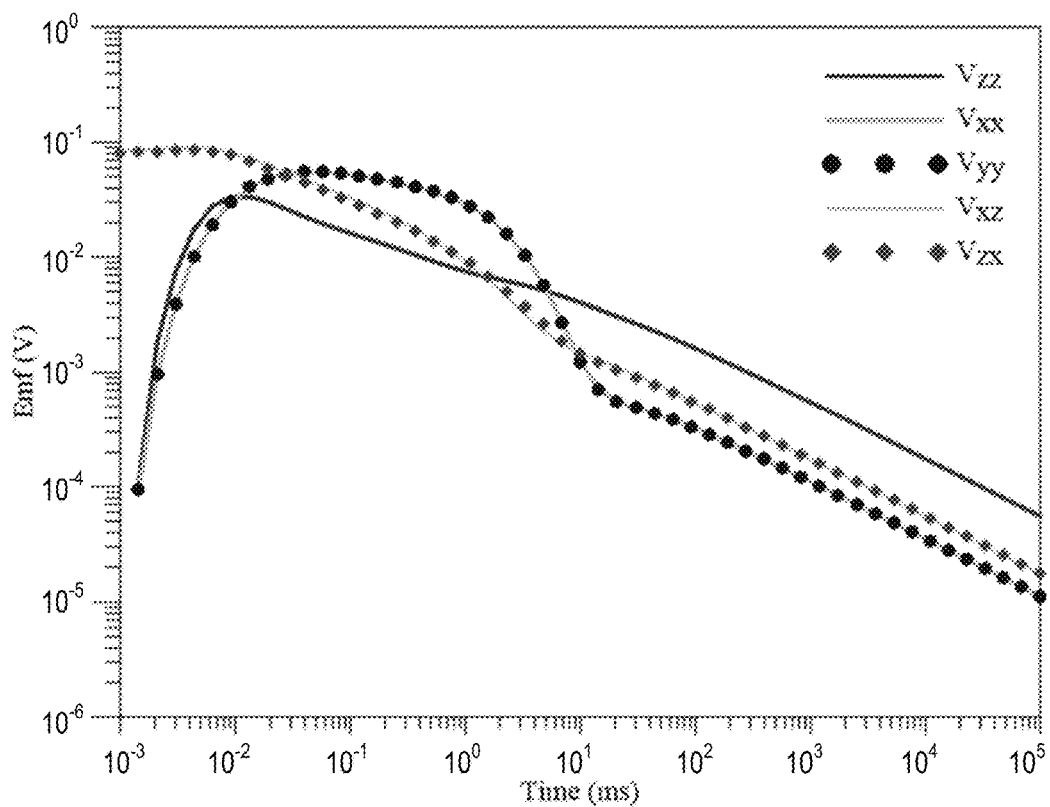
Figures 2, 7:
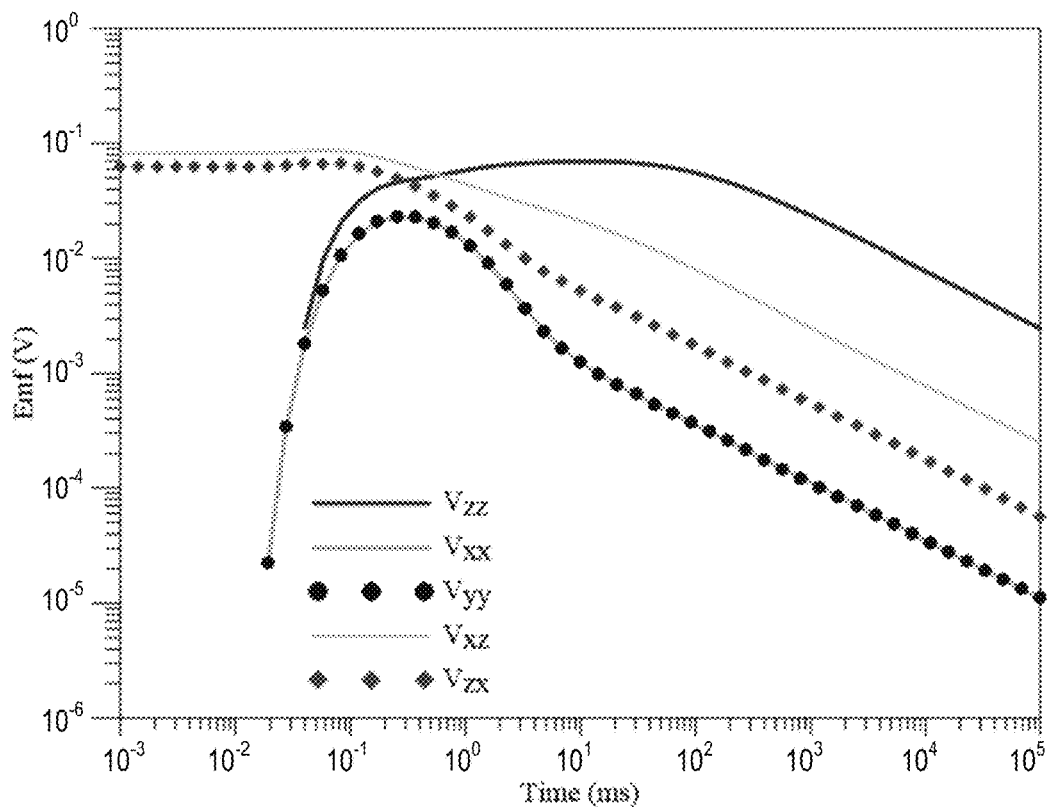

FIG. 7-1 illustrates a curve of an induction potential decaying with time at Point 5 (in a first floor) in the vertical shaft.

Figure 2:
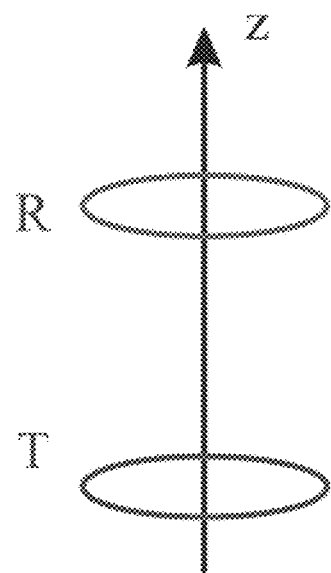
FIG. 2 illustrates a mode of an induction logging device.

FIG. 7-2 illustrates a curve of an induction potential decaying with time at Point 11 (in the second floor) in the vertical shaft.

Figure 3:
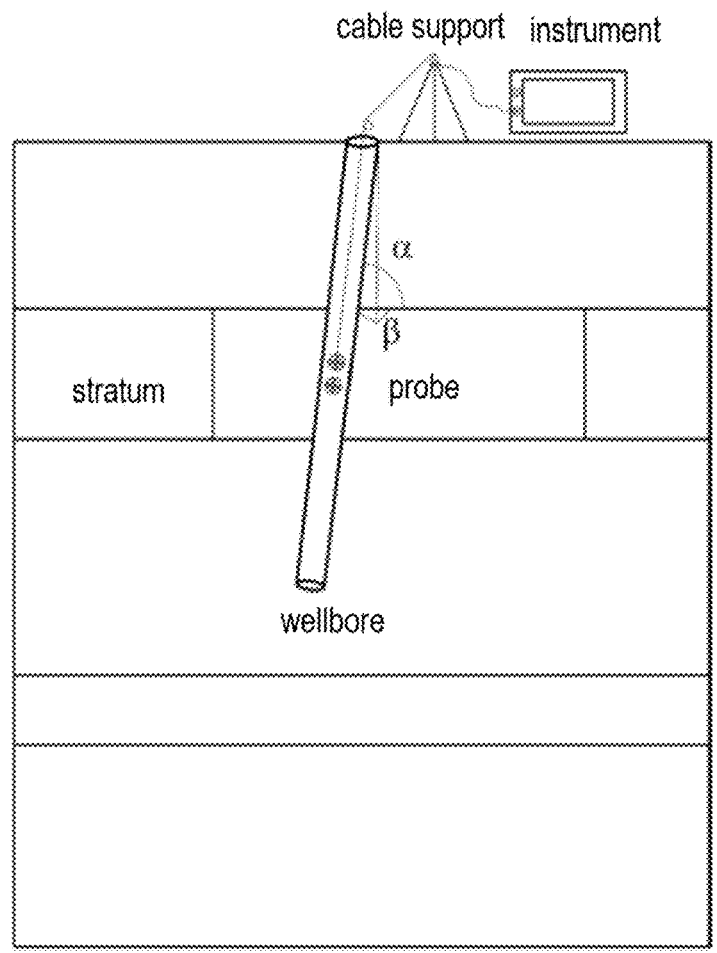
FIG. 3 illustrates a schematic diagram of a logging based on time-domain electromagnetic in a ground drilling.
Figure 4:
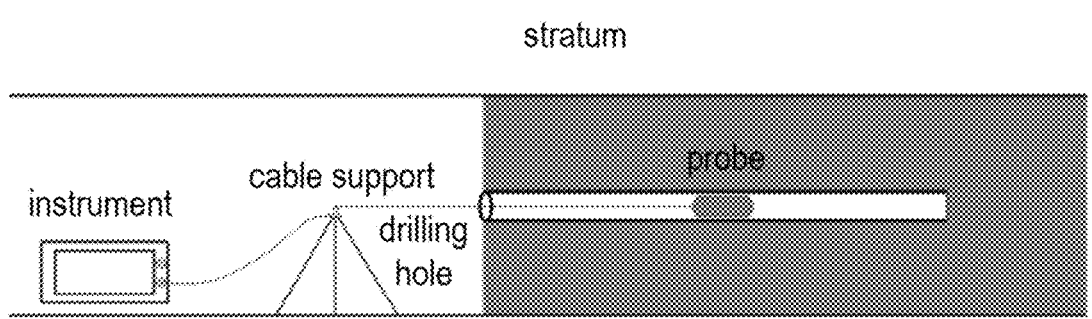
FIG. 4 illustrates a schematic diagram of a logging based on time-domain electromagnetic in an underground space.
Figures 1, 8:
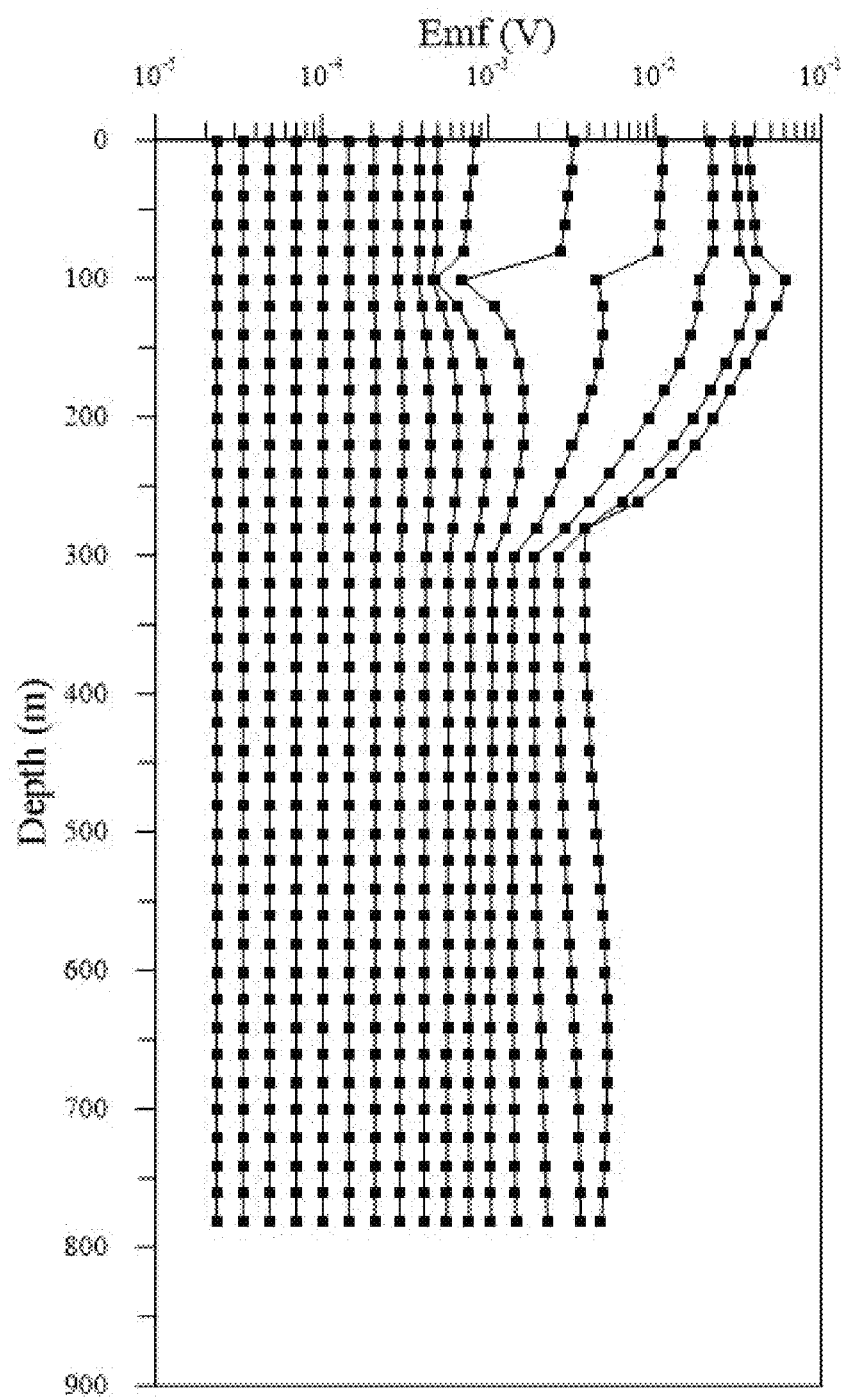
Figures 2, 8:
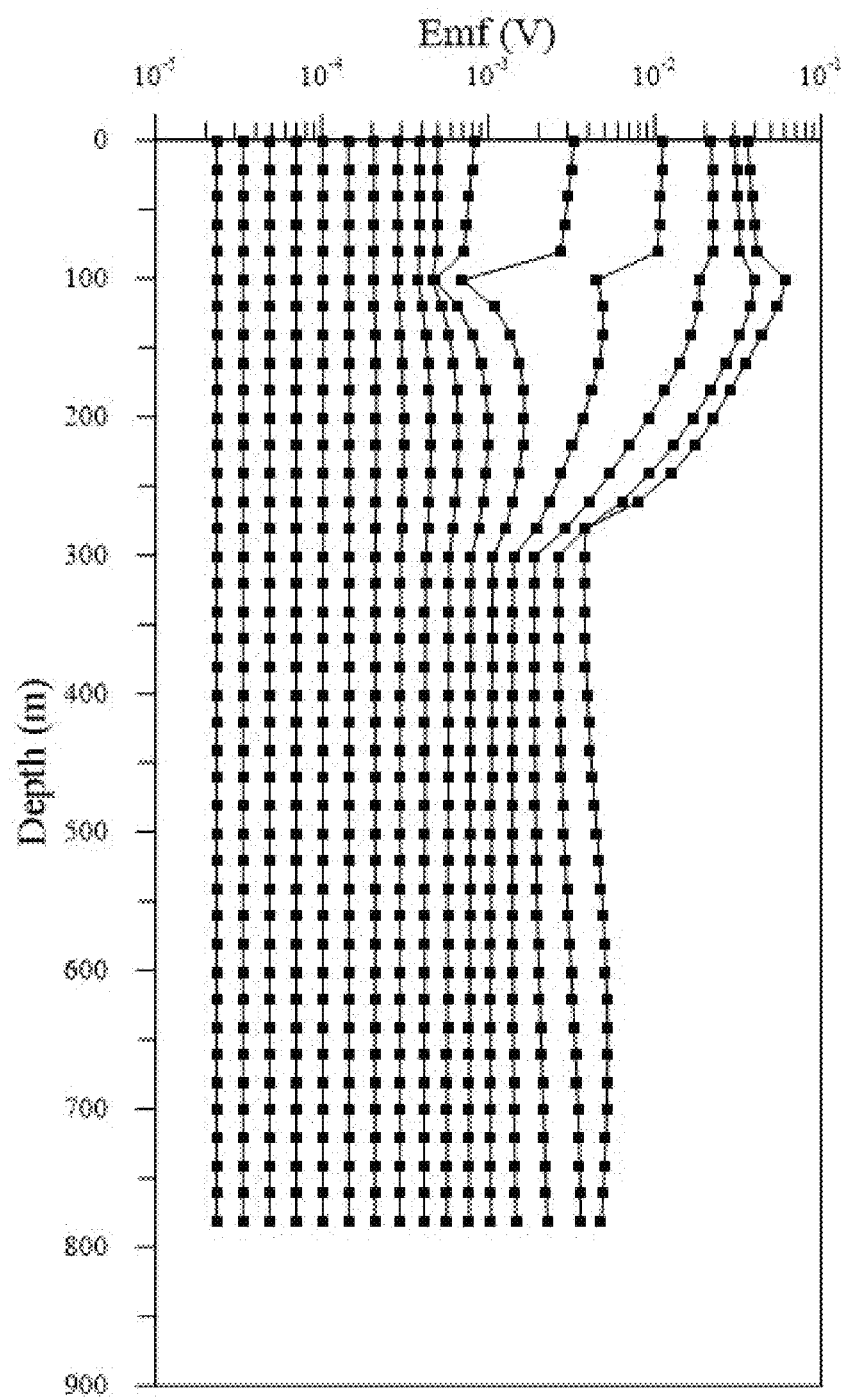
Figures 3, 8:
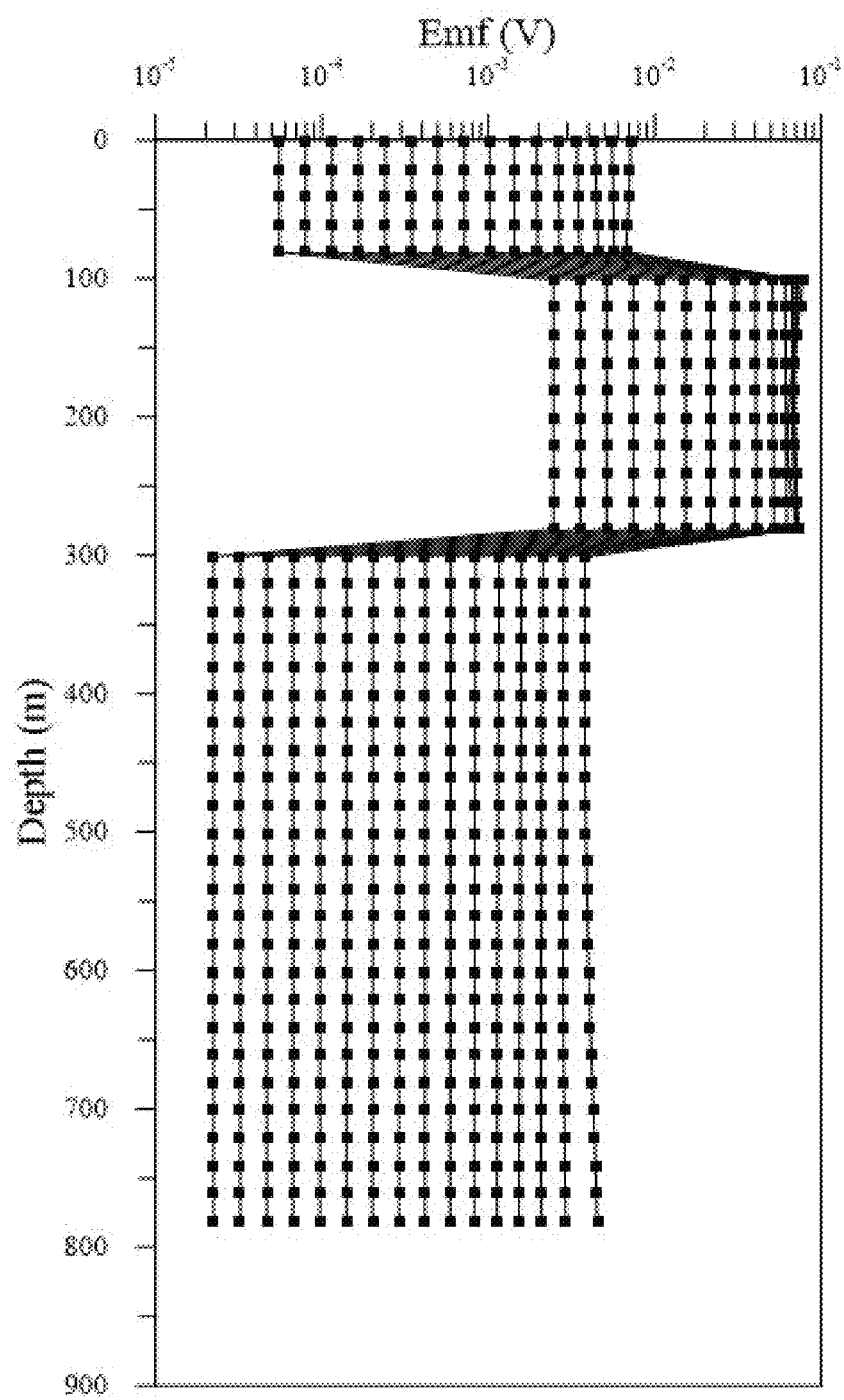
Figures 4, 8:
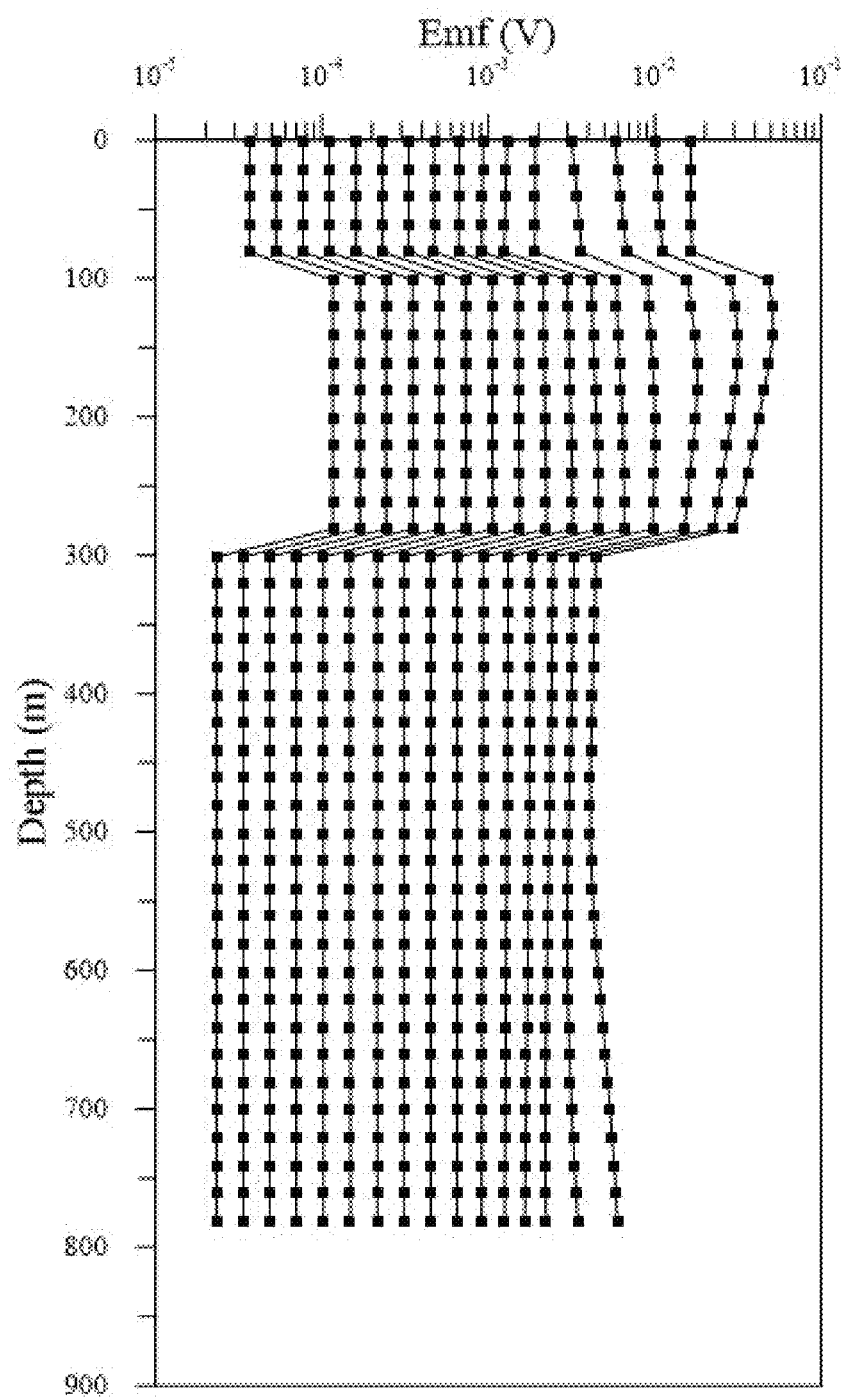

FIG. 8-1 illustrates a multi-channel curve of an induction potential of a component xx in the vertical shaft; FIG. 8-2 illustrates a multi-channel curve of an induction potential of a component yy in the vertical shaft; FIG. 8-3 illustrates a multi-channel curve of an induction potential of a component zz in the vertical shaft; and FIG. 8-4 illustrates a multi-channel curve of an induction potential of a component zx in the vertical shaft.

Figures 1, 9:
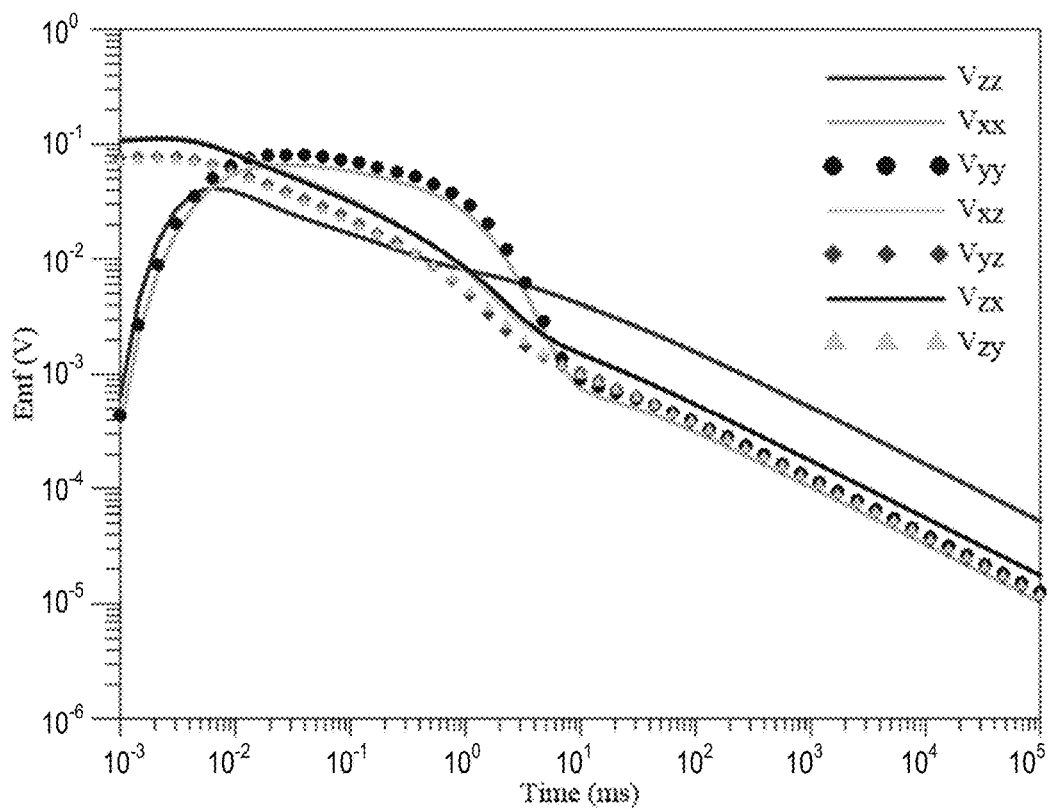
Figures 2, 9:
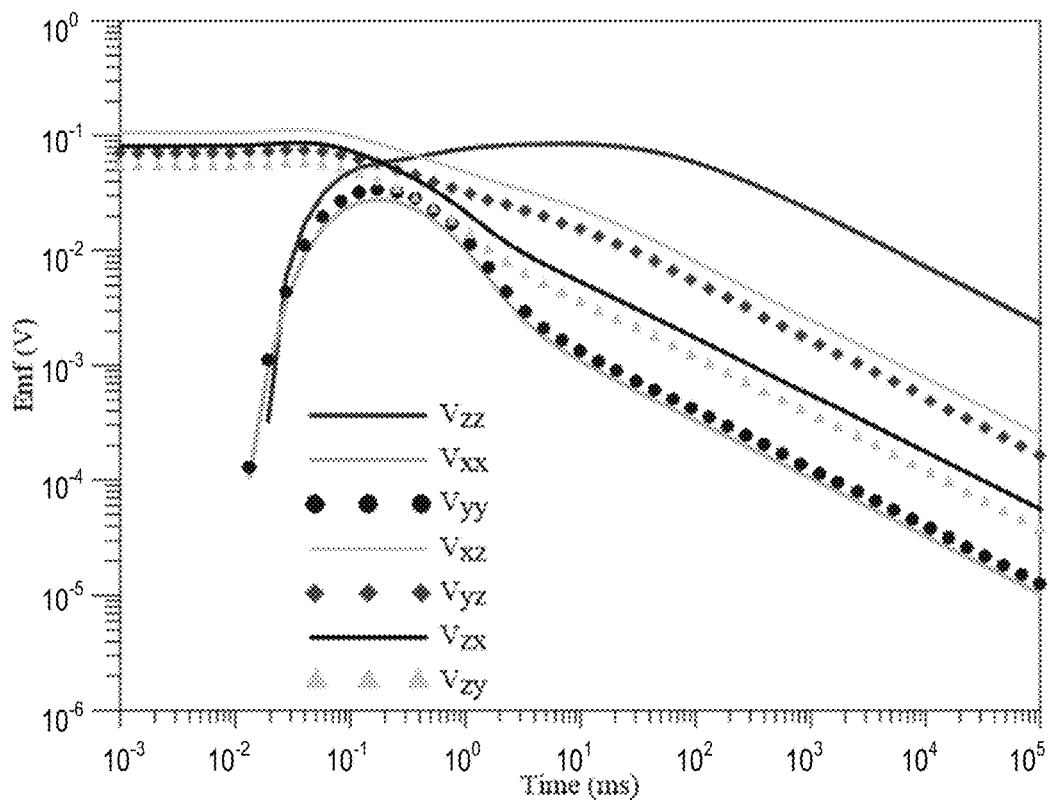

FIG. 9-1 illustrates a curve of an induction potential decaying with time at Point 5 (in the first layer) in the inclined shaft.

FIG. 9-2 illustrates a curve of an induction potential decaying with time at Point 11 (in the second layer) in the inclined shaft.

Figures 1, 10:
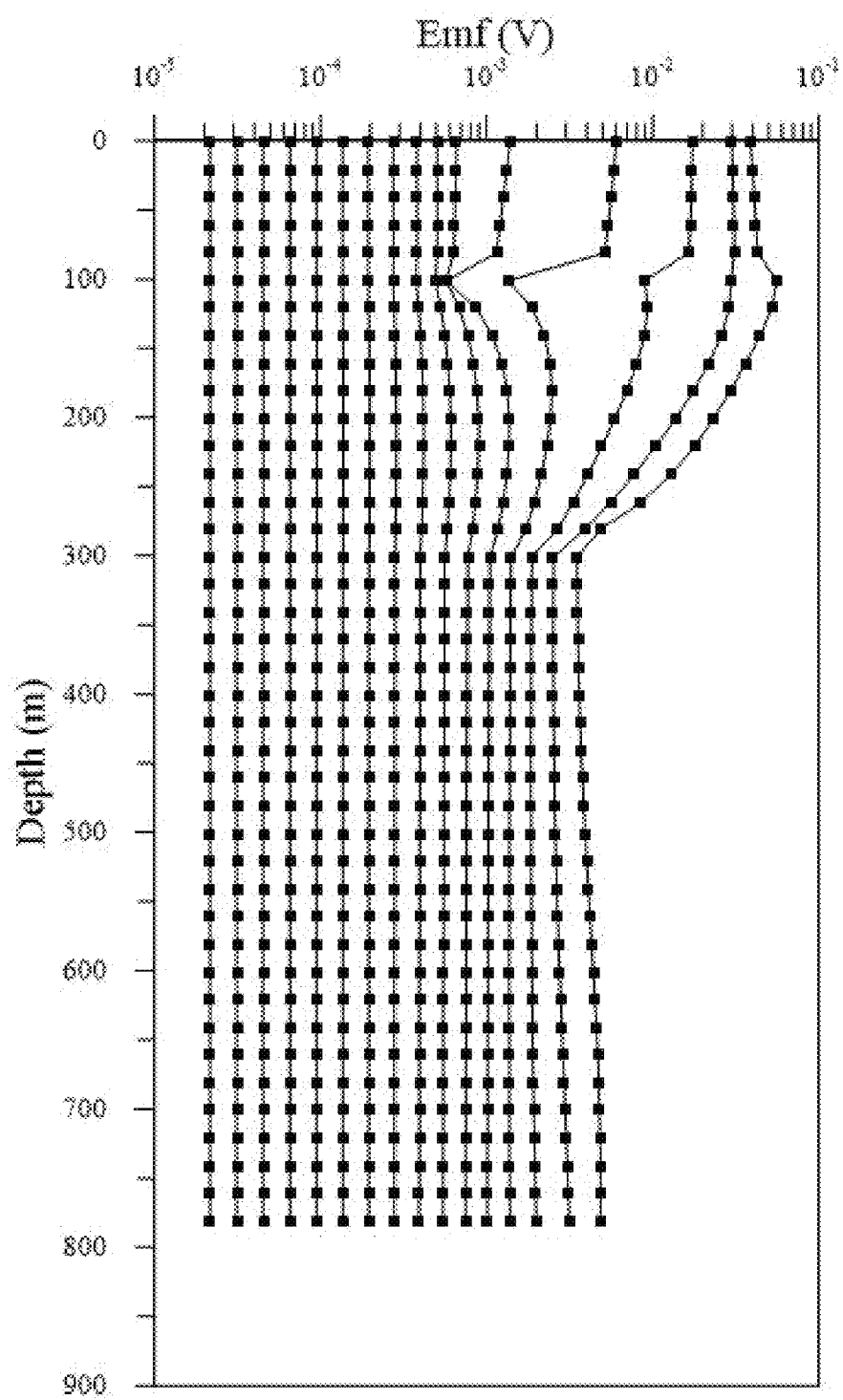
Figures 2, 10:
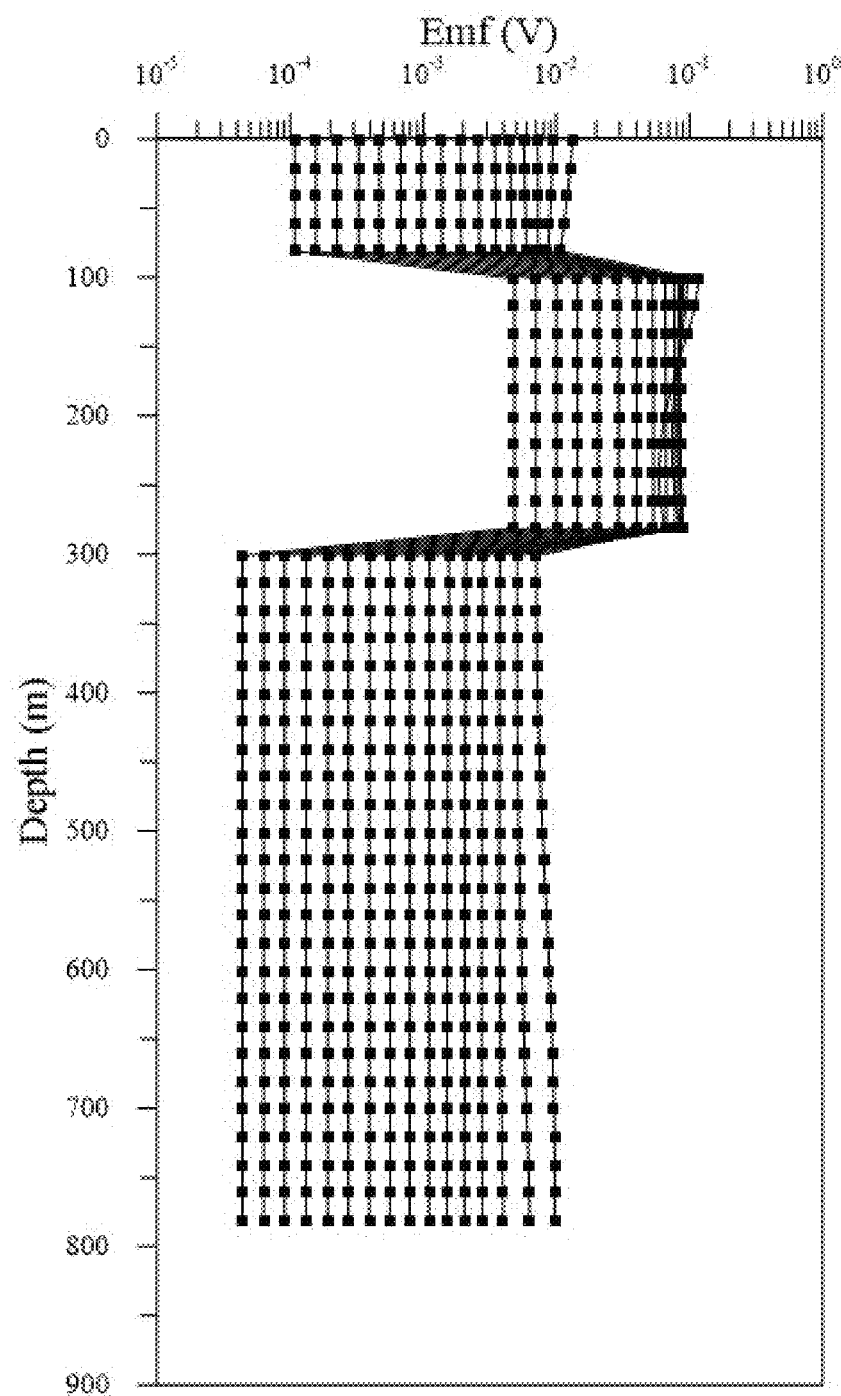
Figures 3, 10:
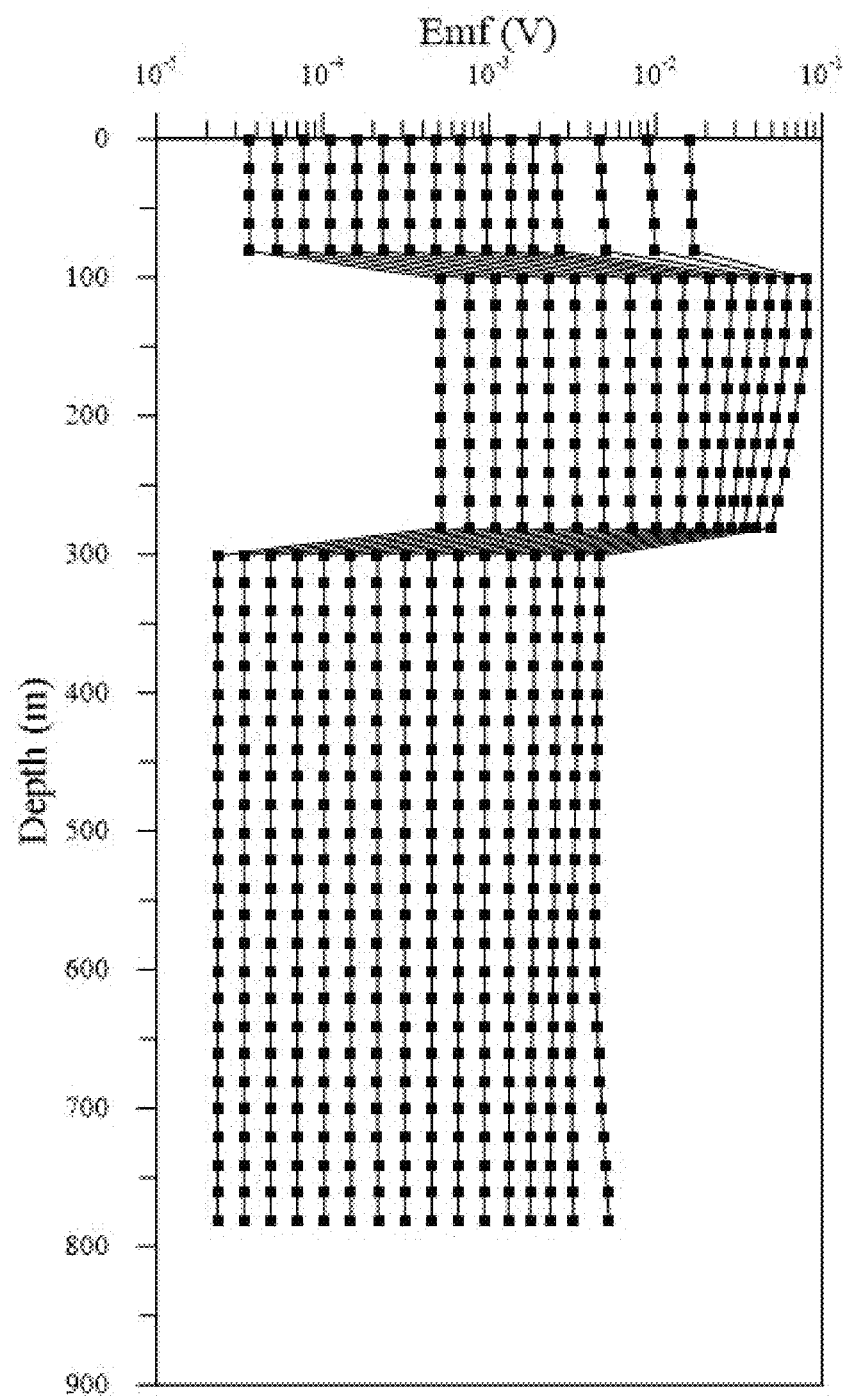
Figures 4, 10:
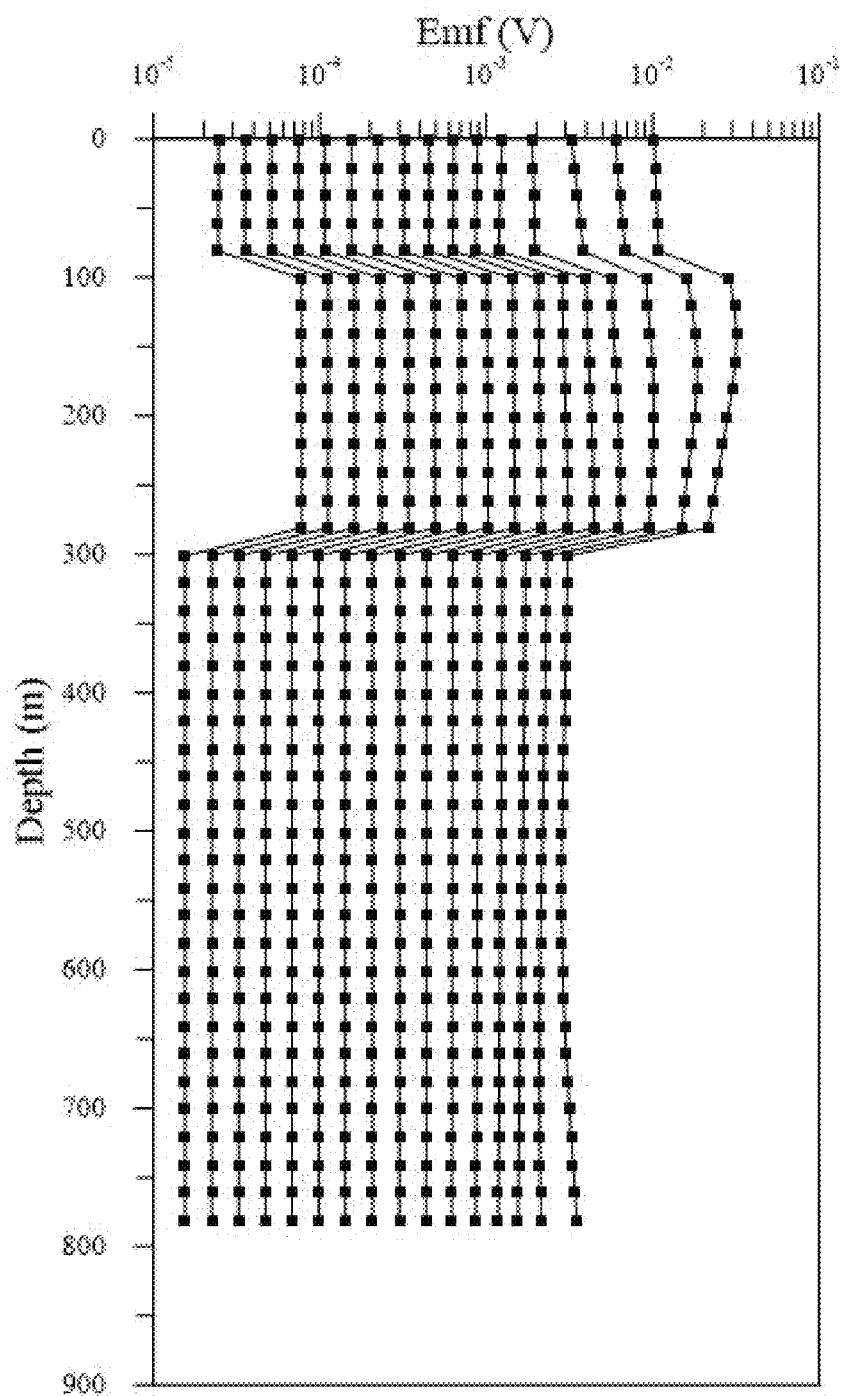

FIG. 10-1 illustrates a multi-channel curve of an induction potential of a component xx in the inclined shaft; FIG. 10-2 illustrates a multi-channel curve of an induction potential of a component zz in the inclined shaft; FIG. 10-3 illustrates a multi-channel curve of an induction potential of a component xz in the inclined shaft; and FIG. 10-4 illustrates a multi-channel curve of an induction potential of a component zy in the inclined shaft.

DESCRIPTION OF EMBODIMENTS

The technical solutions of the present disclosure will be further described below with reference to the accompanying drawings and the embodiments.

The time-domain electromagnetic response is measured by the logging method based on the time-domain electromagnetic tensor described in the present disclosure. In this method, a time-domain electromagnetic field is excited by means of pairwise orthogonal transmitting coil system Tx, and secondary field signals are received by pairwise orthogonal receiving coil systems Rx located above transmitting coils with a distance of D. As illustrated in FIG. 1. Tx is the transmitting coil system, and Rx is the receiving coil system, which are respectively composed of three coils in different directions and orthogonal to each other, and a borehole probe is formed by the transmitting coil system and the receiving coil system. A potential sequence or a resistivity value that changes over time for a layer where a corresponding measurement point is located can be obtained through each measurement, and a change of the potential sequence or the resistivity of the layer where the measurement point is located from near to far can be obtained after time-depth conversion.

Transmitting in three directions is adopted in present disclosure, which is capable of receiving nine component data at the same time, and each component is a series of induction potentials corresponding to the measurement time series one by one, which is capable of identifying the anisotropic characteristics of geological body more effectively. However, the existing methods can only obtain single-component data and data information in a single direction of the geological body, but cannot obtain the anisotropy information of the geological body. As illustrated in FIG. 2 that is a model of the induction logging device, the transmitting coil T and the receiving coil R are coaxial. The electromagnetic field is excited by the transmitting coil, the secondary field is received by the receiving coil, and the transmitting coil and the receiving coil are separated by a certain distance. The present disclosure can not only be applied to the resource and energy exploration in the fields such as the conventional oil, natural gas, coal as illustrated in FIG. 3, but also can be applied to the detection of the unfavorable geological bodies in engineering tunnels and underground spaces. As illustrated in FIG. 4, the cable bracket and the instrument are arranged in the underground space, and the probe moves in the underground borehole for measurement.

Figure 5:
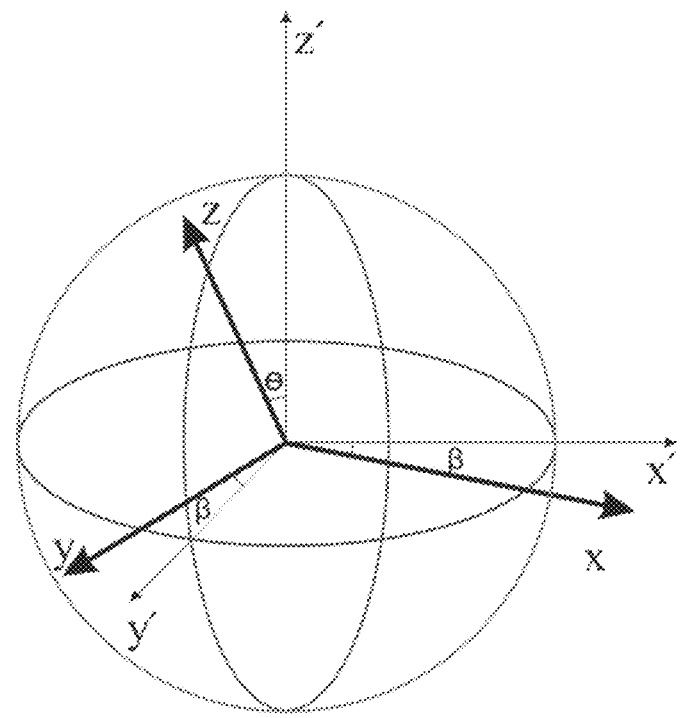
FIG. 5 illustrates a schematic diagram of a stratigraphic coordinate system and an instrument coordinate system.

In actual operations, the probe is rotated when it moves under the traction of the cable (since the instrument is pulled by one cable to move in the well, the instrument is rotated during the movement, in addition to the self-rotation of the instrument, the instrument is also inclined with the direction of the well), therefore, the stratigraphic coordinate system (x, y, z) and the instrument coordinate system (x',y',z') are required to be set, as illustrated in FIG. 5. In FIG. 5, θ is set as an azimuth angle of an instrument tilted. B is set as a self-rotation angle of the instrument during the measuring process, and a rotation angle of the instrument during the descending process, that is the azimuth angle of the instrument.

With respect to the stratum with N layers, the horizontal conductivity of each layer of the stratum is $\sigma_{hi}$, and the vertical conductivity of each layer of the stratum is $\sigma_{vi}$, where i=1,2,3, . . . ,N, the subscript h denotes the horizontal direction, and the subscript v denotes the vertical direction. The equivalent magnetic moments in three directions of the transmitting coils in the probe are $M_{x'}$, $M_{y'}$, $M_{z'}$, and a relationship between the magnetic field intensities $H_{x'}$, $H_{y'}$, $H_{z'}$ received by the receiving coils in three directions of the probe and the equivalent magnetic moments is as follows:

$$\begin{pmatrix} H_{x'} \\ H_{y'} \\ H_{z'} \end{pmatrix} = \overline{R}^T \cdot \overline{G} \cdot \overline{R} \cdot \begin{pmatrix} M_{x'} \\ M_{y'} \\ M_{z'} \end{pmatrix} \qquad (1)$$

where $\overline{G}$ denotes a Dyadic Green's function, each element of the $\overline{G}$ denotes a component in different directions, for example, $G_{xy}$ denotes a component in the xy directions. $\overline{R}$ denotes a transformation matrix from the instrument coordinate system to the stratigraphic coordinate system, and $\overline{R}^T$ denotes a transpose matrix of $\overline{R}$, and $$\overline{G} = \begin{bmatrix} G_{xx} & G_{xy} & G_{xz} \\ G_{yx} & G_{yy} & G_{yz} \\ G_{zx} & G_{zy} & G_{zz} \end{bmatrix} \qquad (2)$$

therefore, the key to obtain the value for each component of the magnetic field intensity is to solve the Dyadic Green's function $\overline{G}$ in Formula (2). The result for calculating the Dyadic Green's function $\overline{G}$ by adopting the transmission line equivalent principle is as follows:

$$\overline{G_{HM}^{mn}} = \begin{bmatrix} \tilde{G}_{xx}^{HM} & \tilde{G}_{xy}^{HM} & \tilde{G}_{xz}^{HM} \\ \tilde{G}_{yx}^{HM} & \tilde{G}_{yy}^{HM} & \tilde{G}_{yz}^{HM} \\ \tilde{G}_{zx}^{HM} & \tilde{G}_{zy}^{HM} & \tilde{G}_{zz}^{HM} \end{bmatrix} = \qquad (3)$$

$$\begin{bmatrix} -\frac{k_x^2}{k_\rho^2} I_v^h - \frac{k_y^2}{k_\rho^2} I_v^e & \frac{k_x k_y}{k_\rho^2} (I_v^e - I_v^h) & \frac{k_x}{\omega \mu_n} I_i^h \\ \frac{k_x k_y}{k_\rho^2} (I_v^e - I_v^h) & -\frac{k_x^2}{k_\rho^2} I_v^h - \frac{k_y^2}{k_\rho^2} I_v^e & \frac{k_y}{\omega \mu_n} I_i^h \\ \frac{k_x}{\omega \mu_m} V_v^h & \frac{k_y}{\omega \mu_m} V_v^h & -\frac{1}{i\omega \mu_m}\left[\frac{k_\rho^2}{-i\omega \mu_m} V_i^h - \delta(z-z')\right] \end{bmatrix}$$

where $\overline{G}_{HM}^{mn}$ denotes a Green's function corresponding to a magnetic field generated by a magnetic current source in area n in area m, each element in the matrix denotes a component in different directions, for example, $\tilde{G}_{xy}^{HM}$ denotes a component in the xy directions, $k_x$, $k_y$ and $k_\rho$ respectively denote propagation coefficients of electromagnetic waves in three direction, w denotes an angular frequency, $\mu_n$ denotes a magnetic permeability in area n, $\mu_m$ denotes a magnetic permeability in area m, z' denotes a field source position, z denotes a field point position, $V_i^P$ denotes a voltage excited by a unit parallel current source and $I_i^P$ denotes a current excited by the unit parallel current source, $V_v^P$ denotes a voltage excited by a unit series voltage source and $I_v^P$ denotes a current excited by the unit series voltage source, when P is e and h, denotes a transverse wave and a transverse magnetic wave respectively, and $\delta$ denotes a Dirac function.

The calculation formulas for variables are divided into two cases.

(1) When the transmitting coil system Tx and the receiving coil system Rx are in the same stratum, and m is equal to n, the electromagnetic field excited by the transmitting coil system at the position z is received by the receiving coil at the position z', the obtained voltages and currents are respectively as follows:

$$V_i^P(n, z; n, z') = \frac{Z_n^P}{2}\left[e^{ik_{zn}^P|z-z'|} + \frac{1}{D_n^P} C_1 \cdot R^P\right] \qquad (4)$$

$$V_v^P(n, z; n, z') = \frac{1}{2}\left[Sgn(z-z')e^{ik_{zn}^P|z-z'|} + \frac{1}{D_n^P} C_2 \cdot R^P\right] \qquad (5)$$

$$I_i^P(n, z; n, z') = \frac{1}{2}\left[Sgn(z-z')e^{ik_{zn}^P|z-z'|} + \frac{1}{D_n^P} C_3 \cdot R^P\right] \qquad (6)$$

$$I_v^P(n, z; n, z') = \frac{Y_n^P}{2}\left[e^{ik_{zn}^P|z-z'|} + \frac{1}{D_n^P} C_4 \cdot R^P\right] \qquad (7)$$

where when P is e and h, e denotes the transverse electric wave and h denotes the transverse magnetic, and Sgn( ) denotes a sign function, $k_{zn}^P$ denotes a wave number of a n-th layer in direction z of the stratigraphic coordinate system, i denotes an imaginary number, $D_n^P$ denotes a correlation function between a thickness of the n-th layer of the stratum and a collective reflection coefficient, $Y_n^P$ denotes an admittance of the n-th layer of the stratum, $Z_n^P$ denotes an impedance of the n-th layer of the stratum, $C_1$, $C_2$, $C_3$ and $C_4$ respectively denote matrix coefficients, and $R^P$ denotes a reflection coefficient matrix, $$Sgn(z) = \begin{cases} 1, z \geq 0 \\ -1, z < 0 \end{cases}, D_n^P = 1 - \overleftarrow{R}_n^P \overrightarrow{R}_n^P t_n, d_n = z_{n-1} - z_n, t_n = e^{i2k_{zn}^P d_n}$$

$$\begin{bmatrix} C_1 \\ C_2 \\ C_3 \\ C_4 \end{bmatrix} = \begin{bmatrix} 1 & 1 & 1 & 1 \\ 1 & -1 & 1 & -1 \\ -1 & 1 & 1 & -1 \\ 1 & -1 & 1 & 1 \end{bmatrix}$$

$$R^P = \begin{bmatrix} \overrightarrow{R}_n^P e^{ik_{zn}^P[2z_{n-1}-(z+z')]} \\ \overleftarrow{R}_n^P e^{ik_{zn}^P[(z+z')-2z_n]} \\ \overleftarrow{R}_n^P \overrightarrow{R}_n^P e^{ik_{zn}^P[2d_n+(z-z')]} \\ \overleftarrow{R}_n^P \overrightarrow{R}_n^P e^{ik_{zn}^P[2d_n-(z-z')]} \end{bmatrix}$$

where $d_n$ denotes a thickness at the n-th layer in the stratum, $t_n$ denotes a thickness factor of the n-th layer of the stratum, $\overleftarrow{R}_n^P$ denotes a collective reflection coefficient of the stratum below the n-th layer, and $\overrightarrow{R}_n^P$ denotes a collective reflection coefficient of the stratum above the n-th layer, $$\overleftarrow{R}_n^P = \frac{R_{n+1,n}^P + \overleftarrow{R}_{n+1}^P t_{n+1}}{1 + R_{n+1,n}^P \overleftarrow{R}_{n+1}^P t_{n+1}}$$

$$\overrightarrow{R}_n^P = \frac{R_{n-1,n}^P + \overrightarrow{R}_{n-1}^P t_{n-1}}{1 + R_{n-1,n}^P \overrightarrow{R}_{n-1}^P t_{n-1}}$$

where $R_{n+1,n}^P$ denotes a reflection coefficient from the n+1-th layer to the n-th layer, and $R_{m,n}^P$ denotes a reflection coefficient from the n-th layer to the m-th layer.

$$R_{m,n}^P = \frac{Z_m^P - Z_n^P}{Z_m^P + Z_n^P}$$

(2) When the transmitting coil system Tx and the receiving coil system Rx are not in the same stratum, the electromagnetic field excited by the transmitting coil system at the position z is received by the receiving coil at the position z', and the obtained voltages and currents are respectively as follows:

$$V_i^P(m, z; n, z') = V_v^P(m, z; n, z') = \quad (8)$$

$$V_{v,i}^P(m, z_{n-1}; n, z') \left\{ \prod_{j=m+1}^{n-1} \overleftarrow{T}_j^P \right\} \frac{\left[1 + \overleftarrow{R}_m^P e^{i2k_{zm}^P(z_{m-1}-z)}\right] e^{ik_{zm}^P(z-z_m)}}{1 + \overleftarrow{R}_m^P t_m}$$

$$I_i^P(m, z; n, z') = I_v^P(m, z; n, z') = \quad (9)$$

$$V_{v,i}^P(m, z_n; n, z') \left\{ \prod_{j=m+1}^{n-1} \overleftarrow{T}_j^P \right\} \frac{Y_m^P\left[-1 + \overleftarrow{R}_m^P e^{i2k_{zm}^P(z_{m-1}-z)}\right] e^{ik_{zm}^P(z-z_m)}}{1 + \overleftarrow{R}_m^P t_m}$$

where $\overleftarrow{T}_j^P$ denotes a voltage transmission coefficient of the j-th layer, $z_n$ denotes a depth of the n-th layer of the stratum, a subscript n denotes a layer number, a change of the subscript n denotes a change of the layer number.

At this point, the magnetic field intensity received by the receiving coil of the probe in the frequency-domain can be obtained, and the obtained frequency-domain magnetic field is converted into the time-domain magnetic field according to the conversion relationship between the time-domain electromagnetic field and the frequency domain electromagnetic field. The formula is as follows:

$$H(t) = \frac{1}{2\pi}\int_{-\infty}^{\infty} \frac{H(\omega)}{j\omega} e^{-j\omega t} d\omega \quad (10)$$

then, the induction voltage is obtained as follows:

$$V(t) = -SN\mu_0 \frac{\partial H(t)}{\partial t} \quad (11)$$

where S denotes an area of the receiving coil, N denotes a number of the turns of the receiving coil, and $\mu_0$ denotes a magnetic permeability in vacuum.

Numerical example: the actual logging is the continuous measurement, in order to facilitate displaying the corresponding relationship between the measurement position and the induction potential curve, the continuous measurement is discretized into a plurality of measurement points.

1. Three-Layer H-Type Stratum in the Vertical Shaft.

A model of the three-layer H-type stratum in the vertical shaft is as illustrated in FIG. 6(a). The thickness of the first to third layers are 100 m, 200 m and 500 m respectively, and the resistivities are 200 Ω·m, 20 Ω·m and 500 Ω·m, respectively.

The characteristics of the curves in FIGS. 7 and 8 are summarized as follows. 1) The component xx and the component yy are coincident, and the component xz and the component zx are coincident under the H-type geoelectric cross section. 2) The measurement points are in different stratums, and the characteristics of the attenuation curves are different. 3) The three components (xz, zx, zz) related to the component z are more sensitive to the conductor layer, but the component xx and component yy have response while the response is weaker.

2. Three-Layer H-Type Stratum in the Inclined Shaft.

A model of three-layer H-type stratum in the inclined shaft is as illustrates in FIG. 6(b). The thickness of the first to third layers are 100 m, 200 m and 500 m respectively, and the resistivities are 200 Ω·m, 20 Ω·m and 500 Ω·m respectively, and the inclined angle of the shaft is 30°.

The characteristics of the curves in FIGS. 9-1 to 10-4 are summarized as follows. 1) The components of the induction potential are separated from each other in the inclined shaft, which is different from the situation that the partial components are coincident in the vertical shaft. The characteristics of the vertical shaft and the inclined shaft that the curves are decayed with time are similar, but the difference between the deep curves of the vertical shaft and the inclined shaft is increased. 2) The multi-track curve can still clearly reflect the response difference caused by the conductivity of the formation. 3) Except for the component zz, two components that the attenuation patterns are consistent with each other and the amplitudes differ by a certain multiple are existed in FIGS. 9-1 to 10-4.

It can be seen from the two numerical examples that in the logging based on the time-domain electromagnetic tensor, the multi-channel induction potential curve of each component corresponds well to the stratum electrical properties. Since the time from early to late corresponds to the distance from near to far, the multi-channel curve can reflect the change of stratum electrical properties around the borehole from near to far. The purpose of detecting the stratum more accurately is achieve through measuring the induction potential by the tensor.

The above descriptions are the preferred embodiments of the present disclosure, it should be pointed out that for those of ordinary skill in the art, without departing from the technical principle of the present disclosure, some improvements and deformations can also be made, and these improvements and deformations should be regarded as the protection scope of the present disclosure.

What is claimed is:

1. A logging method based on a time-domain electromagnetic tensor, wherein the logging method comprises:
   constructing a transmitting coil system Tx and a receiving coil system Rx, wherein the transmitting coil system Tx and the receiving coil system Rx are respectively composed of three coils in different directions and orthogonal to each other, and a borehole probe is formed by the transmitting coil system Tx and the receiving coil system Rx;
   setting a measurement point; exciting, through the transmitting coil system Tx, a time-domain electromagnetic field;
   receiving, by the receiving coil system Rx located above the transmitting coil system Tx with a distance D, secondary field signals;
   receiving the secondary field signals in three component directions simultaneously to obtain nine component data, wherein each component data is a series of induction potentials corresponding to measurement time series one by one;

obtaining, through each measurement time series, a potential sequence or a resistivity value changing over time for a layer where a corresponding measurement point is located; and obtaining, after a time-depth conversion, a change on a potential or a resistivity of the layer where the corresponding measurement point is located, wherein a method for obtaining each resistivity value and induction potential of a magnetic field intensity is as follows:

setting a stratigraphic coordinate system (x,y,z) and an instrument coordinate system (x',y',z'), setting θ as an azimuth angle of an instrument tilted, and β as a self-rotation angle of the instrument during a measuring process and a rotation angle of the instrument during a descending process, that is the azimuth angle of the instrument;

wherein equivalent magnetic moments in three directions of transmitting coils in the borehole probe are $M_{x'}$, $M_{y'}$, $M_{z'}$, and a relationship between magnetic field intensities $H_{x'}$, $H_{y'}$, $H_{z'}$, received by receiving coils in three directions of the borehole probe and the equivalent magnetic moments is:

$$\begin{pmatrix} H'_x \\ H'_y \\ H'_z \end{pmatrix} = \overline{R}^T \cdot \overline{G} \cdot \overline{R} \cdot \begin{pmatrix} M'_x \\ M'_y \\ M'_z \end{pmatrix}$$

where $\overline{G}$ denotes a Dyadic Green's function, $\overline{R}$ denotes a transformation matrix from the instrument coordinate system to the stratigraphic coordinate system, and $\overline{R}^T$ denotes a transpose matrix of $\overline{R}$, and a formula for calculating the Dyadic Green's function $\overline{G}$ by adopting a transmission line equivalent principle is as follows:

$$\overline{\overline{G}}_{HM}^{mn} = \begin{bmatrix} \tilde{G}_{xx}^{HM} & \tilde{G}_{xy}^{HM} & \tilde{G}_{xz}^{HM} \\ \tilde{G}_{yx}^{HM} & \tilde{G}_{yy}^{HM} & \tilde{G}_{yz}^{HM} \\ \tilde{G}_{zx}^{HM} & \tilde{G}_{zy}^{HM} & \tilde{G}_{zz}^{HM} \end{bmatrix} =$$

$$\begin{bmatrix} -\frac{k_x^2}{k_\rho^2} I_v^h - \frac{k_y^2}{k_\rho^2} I_v^e & \frac{k_x k_y}{k_\rho^2}(I_v^e - I_v^h) & \frac{k_x}{\omega\mu_n} I_i^h \\ \frac{k_x k_y}{k_\rho^2}(I_v^e - I_v^h) & -\frac{k_x^2}{k_\rho^2} I_v^e - \frac{k_y^2}{k_\rho^2} I_v^e & \frac{k_y}{\omega\mu_n} I_i^h \\ \frac{k_x}{\omega\mu_m} V_v^h & \frac{k_y}{\omega\mu_m} V_v^h & -\frac{1}{i\omega\mu_m}\left[\frac{k_\rho^2}{-i\omega\mu_m} V_i^h - \delta(z-z')\right] \end{bmatrix}$$

where $\overline{G}_{HM}^{mn}$ denotes a Green's function corresponding to a magnetic field generated by a magnetic current source in area n in area m, each matrix element denotes a component in the different directions, $\tilde{G}_{xy}^{HM}$ denotes a component in xy directions, $k_x$, $k_y$ and $k_\rho$ respectively denote propagation coefficients of electromagnetic waves in the three directions, i denotes an imaginary number, ω denotes an angular frequency, $\mu_n$ denotes a magnetic permeability in the area n, $\mu_m$ denotes a magnetic permeability in the area m, z' denotes a field source position, z denotes a field point position, $V_i^P$ denotes a voltage excited by a unit parallel current source and $I_i^P$ denotes a current excited by the unit parallel current source, $V_v^P$ denotes a voltage excited by a unit series voltage source and $I_v^P$ denotes a current excited by the unit series voltage source, when P is e and h, P denotes a transverse wave and a transverse magnetic wave respectively, and δ denotes a Dirac function; and calculating magnetic field intensities received by the receiving coils of the borehole probe in a frequency domain, and converting, according to a conversion relationship between a time-domain magnetic field and a frequency-domain magnetic field, the frequency-domain magnetic field into the time-domain magnetic field, and further obtaining the series of induction potentials.

2. The logging method based on the time-domain electromagnetic tensor according to claim 1, wherein when the transmitting coil system Tx and the receiving coil system Rx are in a same stratum, and m is equal to n, the time-domain electromagnetic field excited by the transmitting coil system Tx at the field point position z is received by the receiving coil system Rx at the field source position z', obtained voltages and currents are respectively as follow:

$$V_i^P(n,z;n,z') = \frac{Z_n^P}{2}\left[e^{ik_{zn}^P|z-z'|} + \frac{1}{D_n^P}C_1 \cdot R^P\right]$$

$$V_v^P(n,z;n,z') = \frac{1}{2}\left[\text{Sgn}(z-z')e^{ik_{zn}^P|z-z'|} + \frac{1}{D_n^P}C_2 \cdot R^P\right]$$

$$I_i^P(n,z;n,z') = \frac{1}{2}\left[\text{Sgn}(z-z')e^{ik_{zn}^P|z-z'|} + \frac{1}{D_n^P}C_3 \cdot R^P\right]$$

$$I_v^P(n,z;n,z') = \frac{Y_n^P}{2}\left[e^{ik_{zn}^P|z-z'|} + \frac{1}{D_n^P}C_4 \cdot R^P\right]$$

where Sgn( ) denotes a sign function, $k_{zn}^P$ denotes a wave number of a n-th layer in z direction of the stratigraphic coordinate system, i denotes the imaginary number, $D_n^P$ denotes a correlation function between a thickness of the n-th layer of the stratum and a collective reflection coefficient, $Y_n^P$ denotes an admittance of the n-th layer of the stratum, $Z_n^P$ denotes an impedance of the n-th layer of the stratum, $C_1$, $C_2$, $C_3$, $C_4$ respectively denote matrix coefficients, and $R^P$ denotes a reflection coefficient matrix;

$$\text{Sgn}(z) = \begin{cases} 1, z \geq 0 \\ -1, z < 0 \end{cases}, D_n^P = 1 - \overleftarrow{R}_n^P \overrightarrow{R}_n^P t_n, d_n = z_{n-1} - z_n, t_n = e^{i2k_{zn}^P d_n}$$

$$\begin{bmatrix} C_1 \\ C_2 \\ C_3 \\ C_4 \end{bmatrix} = \begin{bmatrix} 1 & 1 & 1 & 1 \\ 1 & -1 & 1 & -1 \\ -1 & 1 & 1 & -1 \\ 1 & -1 & 1 & 1 \end{bmatrix}$$

$$R^P = \begin{bmatrix} \overrightarrow{R}_n^P e^{ik_{zn}^P[2z_{n-1}-(z+z')]} \\ \overleftarrow{R}_n^P e^{ik_{zn}^P[(z+z')-2z_n]} \\ \overleftarrow{R}_n^P \overrightarrow{R}_n^P e^{ik_{zn}^P[2d_n+(z-z')]} \\ \overleftarrow{R}_n^P \overrightarrow{R}_n^P e^{ik_{zn}^P[2d_n-(z-z')]} \end{bmatrix}$$

where $d_n$ denotes the thickness at the n-th layer in the stratum, $z_n$ denotes a depth of the n-th layer of the stratum, a subscript n denotes a layer number, a change of the subscript n denotes a change of the layer number, $t_n$ denotes a thickness factor of the n-th layer of the stratum, and $\overleftarrow{R}_n^P$ denotes a collective reflection coefficient of the stratum below the n-th layer, and $\overrightarrow{R}_n^P$ denotes a collective reflection coefficient of the stratum above the n-th layer.

3. The logging method based on the time-domain electromagnetic tensor according to claim 2, wherein formulas for calculating the collective reflection coefficient of the stratum below the n-th layer and the collective reflection coefficient of the stratum above the n-th layer are as follows:

$$\overleftarrow{R}_n^P = \frac{R_{n+1,n}^P + \overleftarrow{R}_{n+1}^P t_{n+1}}{1 + R_{n+1,n}^P \overleftarrow{R}_{n+1}^P t_{n+1}}$$

$$\overrightarrow{R}_n^P = \frac{R_{n-1,n}^P + \overrightarrow{R}_{n-1}^P t_{n-1}}{1 + R_{n-1,n}^P \overrightarrow{R}_{n-1}^P t_{n-1}}$$

where $t_{n+1}$ denotes a thickness factor of a n+1-th layer of the stratum, $t_{n-1}$ denotes a thickness factor of a n−1-th layer of the stratum, $R_{n+1,n}^P$ denotes a reflection coefficient from the n+1-th layer to the n-th layer, $R_{m,n}^P$ denotes a reflection coefficient from the n-th layer to the m-th layer, and a formula for calculating the $R_{m,n}^P$ is as follows:

$$R_{m,n}^P = \frac{Z_m^P - Z_n^P}{Z_m^P + Z_n^P}$$

where $Z_m^P$ denotes an impedance of the m-th layer of the stratum, $Z_n^P$ denotes an impedance of the n-th layer of the stratum.

4. The logging method based on the time-domain electromagnetic tensor according to claim 1, wherein when the transmitting coil system Tx and the receiving coil system Rx are not in a same stratum, the time-domain electromagnetic field excited by the transmitting coil system Tx at the field point position z is received by the receiving coil system Rx at the field source position z', and obtained voltages and currents are respectively as follows:

$$V_i^P(m, z; n, z') = V_v^P(m, z; n, z') =$$
$$V_{v,i}^P(m, z_{n-1}; n, z') \left\{ \prod_{j=m+1}^{n-1} \overleftarrow{T}_j^P \right\} \frac{\left[1 + \overleftarrow{R}_m^P e^{i2k_{zm}^P(z_{m-1}-z)}\right] e^{ik_{zm}^P(z-z_m)}}{1 + \overleftarrow{R}_m^P t_m}$$

$$I_i^P(m, z; n, z') = I_v^P(m, z; n, z') =$$
$$V_{v,i}^P(m, z_n; n, z') \left\{ \prod_{j=m+1}^{n-1} \overleftarrow{T}_j^P \right\} \frac{Y_m^P \left[-1 + \overleftarrow{R}_m^P e^{i2k_{zm}^P(z_{m-1}-z)}\right] e^{ik_{zm}^P(z-z_m)}}{1 + \overleftarrow{R}_m^P t_m}$$

where $\overleftarrow{T}_j^P$ denotes a voltage transmission coefficient of a j-th layer, $z_n$ denotes a depth of the n-th layer of the stratum, a subscript n denotes a layer number, a change of the subscript n denotes a change of the layer number, $t_m$ denotes a thickness factor of an m-th layer of the stratum, and $\overleftarrow{R}_m^P$ denotes a collective reflection coefficient of the stratum below the m-th layer.

5. The logging method based on the time-domain electromagnetic tensor according to claim 4, wherein formulas for calculating the collective reflection coefficient of the stratum below the n-th layer and the collective reflection coefficient of the stratum above the n-th layer are as follows:

$$\overleftarrow{R}_n^P = \frac{R_{n+1,n}^P + \overleftarrow{R}_{n+1}^P t_{n+1}}{1 + R_{n+1,n}^P \overleftarrow{R}_{n+1}^P t_{n+1}}$$

$$\overrightarrow{R}_n^P = \frac{R_{n-1,n}^P + \overrightarrow{R}_{n-1}^P t_{n-1}}{1 + R_{n-1,n}^P \overrightarrow{R}_{n-1}^P t_{n-1}}$$

where $t_{n+1}$ denotes a thickness factor of a n+1-th layer of the stratum, $t_{n-1}$ denotes a thickness factor of a n−1-th layer of the stratum, $R_{n+1,n}^P$ denotes a reflection coefficient from the n+1-th layer to the n-th layer, $R_{m,n}^P$ denotes a reflection coefficient from the n-th layer to the m-th layer, and a formula for calculating the $R_{m,n}^P$ is as follows:

$$R_{m,n}^P = \frac{Z_m^P - Z_n^P}{Z_m^P + Z_n^P}$$

where $Z_m^P$ denotes an impedance of the m-th layer of the stratum, $Z_n^P$ denotes an impedance of the n-th layer of the stratum.

* * * * *